US012167192B2

(12) United States Patent
Goh et al.

(10) Patent No.: US 12,167,192 B2
(45) Date of Patent: Dec. 10, 2024

(54) SYSTEM AND METHOD FOR OPERATION OF A HEADSET WITH AN ADAPTIVE CLAMPING FORCE

(71) Applicant: Dell Products, LP, Round Rock, TX (US)

(72) Inventors: Peng Lip Goh, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 141 days.

(21) Appl. No.: 17/870,447

(22) Filed: Jul. 21, 2022

(65) Prior Publication Data

US 2024/0031719 A1 Jan. 25, 2024

(51) Int. Cl.
*H04R 1/10* (2006.01)

(52) U.S. Cl.
CPC ......... *H04R 1/1041* (2013.01); *H04R 1/1008* (2013.01); *H04R 2420/07* (2013.01)

(58) Field of Classification Search
CPC . H04R 1/1041; H04R 1/1008; H04R 2420/07
See application file for complete search history.

(56) References Cited

U.S. PATENT DOCUMENTS 10,129,629 B1 * 11/2018 Betita .................... H04R 1/105
2015/0322830 A1 * 11/2015 Rigling ............... F01L 13/0036 123/90.11
2020/0037076 A1 * 1/2020 Boulanger ........... H04R 1/1041

* cited by examiner

*Primary Examiner* — Andrew Sniezek
(74) *Attorney, Agent, or Firm* — Prol Intellectual Property Law, PLLC; H. Kenneth Prol

(57) ABSTRACT

A headset device comprising a headband and an earcup housing having a speaker and an earcup cushion operatively coupled to a cushion cradle axially movable in the earcup housing, a pressure sensor in the earcup cushion to measure clamping force of the headset device on the user's head and a microcontroller executing code instructions of a clamping force control system to determine whether the measured clamping force of the headset device is within a clamping force threshold range. The headset device includes a magnetic headset force adjustment system having a fixed magnet operatively coupled to the axially movable cushion cradle and a current-controlled magnet to adjust clamping force by providing current to the current-controlled magnet to generate a repelling or attractive magnetic force to urge the cushion cradle toward or away from the user's head and adjust the clamping force of the headset device on the user's head.

20 Claims, 5 Drawing Sheets

SYSTEM AND METHOD FOR OPERATION OF A HEADSET WITH AN ADAPTIVE CLAMPING FORCE

FIELD OF THE DISCLOSURE

The present disclosure generally relates to wireless headset devices, such as headphones. More specifically, the present disclosure relates to a system for providing control of an adaptive clamping force for a wireless headset device for use with an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more peripheral input/output devices such as a keyboard, mouse, touchpad, display device, camera, wearable peripheral device, touchpad, speakers, headset, earbuds, headphones, microphone, or other peripheral devices. Similarly, user may interface with one or more of the peripheral input/output device such as a display device, headset, earbuds, headphones, camera, microphone or other peripheral device to input commands or to receive feedback from operating software applications on the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
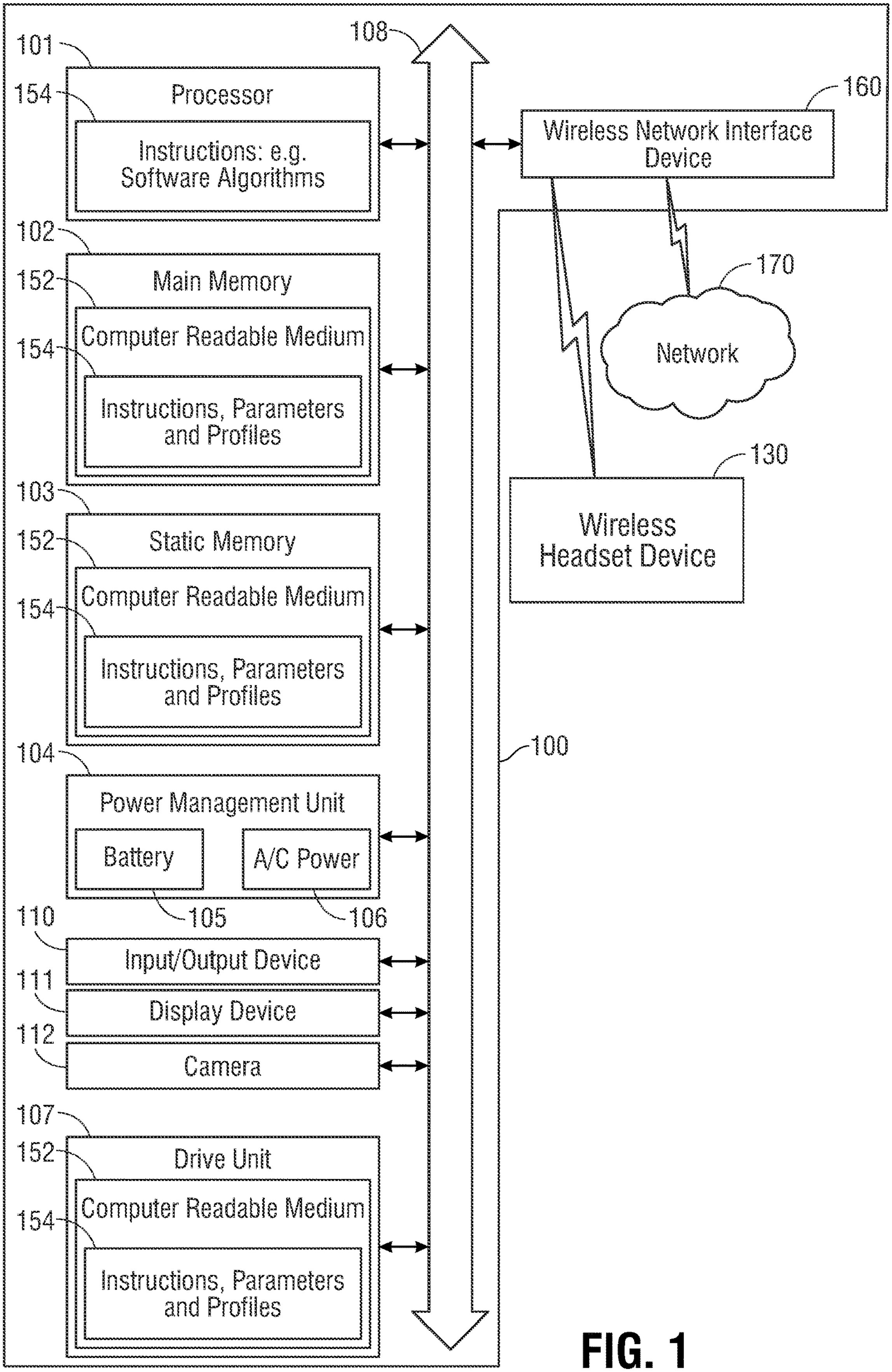
FIG. 1 is a block diagram illustrating an information handling system operatively coupled to a wireless headset device according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of mobile information handling systems such as smart phones, tablets, or laptops may employ one or more peripheral wireless headset devices (e.g., earbuds, headphones, smart speakers) located remotely from the host mobile information handling system to transmit and receive streaming audio data such as streaming music, streaming podcasts, phone calls, or online meetings (e.g., through Zoom®, or Microsoft® Teams®). In some embodiments, a wireless headset device may have plural uses including receiving and transmitting audio data streams for playback of sound or for receiving sound from a microphone. The wireless headset device may have one or more radios to be wirelessly linked to a host information handling systems to receive or transmit audio streams. The wireless headset device may receive audio data streaming input and output from a mobile information handling system as well as command data and signals. Further, in embodiment of the present disclosure, a mobile information handling system may operate one or more software applications or hardware systems that may present a graphical user interface (GUI) or other graphical content on a display device to a user while utilizing the headset device. The headset device may be a wired or wireless headset device and operate according to one or more embodiments herein. For purposes of discussion, the present disclosure discusses a wireless headset device in particular embodiments, but the embodiments herein may also be used with a wired headset device as well.

Headset devices according to embodiments herein include a headband and an earcup with earcup cushions that is formed to fit around a user's head. The headband, earcups and earcup cushions provide a fitted clamping force around the user's head to hold the earcups on the ears of the user. However, headset clamping force on a user's head is dependent upon the size of a user's head, particularly the width of a user's head. When a headset device may be shared among multiple users in an example scenario, changing or adjusting the headset may be cumbersome when switching between users. A user with a larger head may feel uncomfortable with the headset potentially exerting a higher clamping force on the user's head relative to a headband setting for a different user. For a user with a smaller head, a headset device may feel loose with not enough clamping force on the user's head relative to a headband setting for a different user.

Embodiments of the present application describe a headset clamping control system executing on a microcontroller chip or other processing resource of a headset device to work with a magnetic headset force adjustment system that may magnetically adjust the clamping force of the headset device. Pressure sensors in the earcup cushions may detect clamping force on a user's head when the user dons or puts on the headset device in embodiments herein. With the pressure sensors, the headset clamping control system may determine if the clamping force is within a threshold clamping force range that is comfortable for users. If the clamping force is outside a threshold clamping force range, then an instruction may be provided to a magnetic mechanism such driving current or a current pulse to one or more current adjustable magnets to interact with fixed magnets to increase or decrease clamping pressure on the user's head. The magnetic headset adjustment system works by flipping polarity or inducing magnetic force on one or more magnets to pull or push a cushion cradle of an earcup cushion and squeeze or expand a flexible gasket between the cushion cradle and the earcup housing of the headset device according to an embodiment. In this way, adjustment of the clamping force of a headset device on a user's head may be made automatically to fall within a threshold clamping force range in embodiments herein.

FIG. 1 illustrates an information handling system 100 according to several aspects of the present disclosure. In particular, for one or more embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication and may serve as a host for an active audio data stream for wireless communication to a wireless headset device or communication to a wired headset device. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Each information handling system 100 in an embodiment is operably coupled to one or more wireless headset devices 130 and capable of wirelessly receiving and transmitting audio data, such as a voice call or streaming audio content (e.g., podcast, music, etc.) via a link via the wireless network interface device 160 of information handling system 100. In some embodiments, the wireless headset device 130 may comprise a wearable hearing device that a user may position in or around the user's ears, such as earbuds or headphones. As described, an information handling system 100 may be any mobile information handling system, such as a smart phone, tablet, or laptop, operating as a host information handling system to wirelessly link with a wireless headset device 130 and transceive an active audio data stream via that wireless link. Further, command signals may be transmitted between the host information handling system 100 and a wireless headset device 130 on a wireless link or to a wired headset device, such as in a sideband communication in some embodiments.

The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101, the wireless network interface device 160, a static memory 103 or drive unit 107 or other components of an information handling system. The information handling system 100 may also include one or more buses (e.g., 108) operable to transmit communications between the various hardware components. Portions of an information handling system 100 may themselves be considered information handling systems 100 in the embodiments presented herein.

The wireless network interface device 160 in an embodiment may be capable of communication between the information handling system and network 170 (e.g., LAN, WLAN, WAN, WLAN) in some embodiments. Further, wireless network interface device 160 may be capable of communication with the paired wireless headset device 130 using a wireless link established using Near Field Communication (NFC), or Bluetooth® technology such as Bluetooth (BT) or Bluetooth Low Energy (BLE) protocols, for example. The wireless network interface device 160 in an embodiment may transmit and receive information necessary to pair the wireless headset device 130 with the information handling system 100, such as, for example, pairing or wireless communication profiles for the host information handling system 100 and the wireless headset device 130. Such pairing or wireless communication profiles may operate to identify the wireless headset device 130 as a device authorized to transceive data with the host information handling system 100, as well as information sufficient to identify the wireless headset device 130, such as a Media Access Control (MAC) address, IP address. The pairing or wireless communication profiles in an embodiment may further store various types of information necessary to perform a handshake between at least one wireless headset device 130 and the host information handling system 100, such as various public keys, private keys, hashing algorithms, short-term keys, long-term keys, or encryption/decryption algorithms. Further, the network interface device 160 in an embodiment may establish a wireless link with the network 170 to conduct an active audio data stream from a remote source such as an ongoing call, virtual meeting, or audio streaming from an online audio streaming service.

Information handling system 100 may include devices or modules that embody one or more of the devices or execute instructions for the one or more systems and modules described herein, and operates to perform one or more of the methods described herein. The information handling system 100 may execute code instructions 154 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a GPU, a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 152 storing instructions 154. Instructions 154 may include a gaze detection function system 140, operating system (OS) software, application software, BIOS software, or other software applications or drivers detectable by processor type 101.

The disk drive unit 107 and static memory 103 may also contain space for data storage in a computer readable medium 152. The instructions 154 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110 including a display device 111, camera 112, keyboard, touchpad, mouse, or the like.

Information handling system 100 in an embodiment may be in communication, via a wireless network interface device, with a wireless headset device 130 such as earbuds or headphones, as described in greater detail herein. The host information handling system 100 in such an embodiment may operate on wired and wireless links to connect with the network 170 via a network Access Point (AP) or base station, as described in greater detail herein.

The network interface device 160 may provide connectivity of the information handling system 100 as a host of at least one active audio data stream to an operatively coupled wireless input/output devices such as wireless headset device 130. For example, the wireless network interface device 160 may establish a wireless link directly to the wireless headset device 130. In some embodiments, another wireless link directly to the wireless headset device 130, or any number of additional wireless links I/O devices 110 may be established in embodiments herein. Such wireless links may be established pursuant to the Bluetooth® or Bluetooth Low Energy® (BLE) protocols, for example. In some embodiments, the Bluetooth® protocols or BLE protocols (e.g., protocols established under the Institute of Electrical and Electronics Engineers protocol 802.15.1) may be used to establish a Private Area Network (PAN) (e.g., 170) in which the information handling system 100 may communicate wirelessly with any wireless headset devices (e.g., 130 and 180) paired to the PAN 170 using a Bluetooth® compliant pairing and wireless communication profile. The PAN 170 in such an embodiment may communicate data between the information handling system 100 and any paired wireless headset devices (e.g., 130 and 180) over short distances using Ultra High Frequency (UHF) radio waves in the Industrial, Scientific, and Medical purposes bands (ISM bands) between 2.402 and 2.48 GHz. Reference to Bluetooth® may refer to either or both of the Bluetooth® or Bluetooth Low Energy (BLE) and any revision of those protocols.

The network interface device 160 may provide connectivity of the information handling system 100 to the network 170 via a dedicated link, to a network AP or base station in an embodiment. In another embodiment, network interface device 160 may provide connectivity of the information handling system 100 to one or more wireless peripheral input/output devices 110 such as a wireless headset device 130. Connectivity to the wireless headset device 130 may be with a headset or earbuds in an example embodiment and may be via a BT or BLE wireless link or a proprietary wireless link such as at 2.4 GHz as well as via any near field communication link or other wireless link to establish a wireless link or a wireless personal area network between the information handling system 100 and one or more wireless peripheral input/output devices 110 such as a wireless headset device 130. The network 170 in some embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection.

In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 154 or receives and executes instructions, parameters, and profiles 154 responsive to a propagated signal, so that a device connected to a network 170 may communicate voice, video or data over the network 170. Further, the instructions 154 may be transmitted or received over the network 170 via the network interface device 160. The information handling system 100 may include a set of instructions 154 that may be executed to cause the computer system to perform any one or more of the methods or computer-based functions disclosed herein. For example, instructions 154 may include a particular example of a gaze detection function system 140, or other aspects or components. Various software modules comprising application instructions 154 may be coordinated by an operating system (OS), and/or via an application programming interface (API). An example operating system may include Windows®, Android®, and other OS types. Example APIs may include Win 32, Core Java API, or Android APIs. Application instructions 154 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. For example, pairing or wireless communication profiles in an embodiment may further store various types of information necessary for a wireless link such as that to perform a handshake between the wireless headset device 130 and the information handling system 100, such as various public keys, private keys, hashing algorithms, short-term keys, long-term keys, or encryption/decryption algorithms. After establishing a wireless link in an embodiment, the host information handling system 100 may begin transmitting and receiving audio data streams from a wireless headset device 130.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
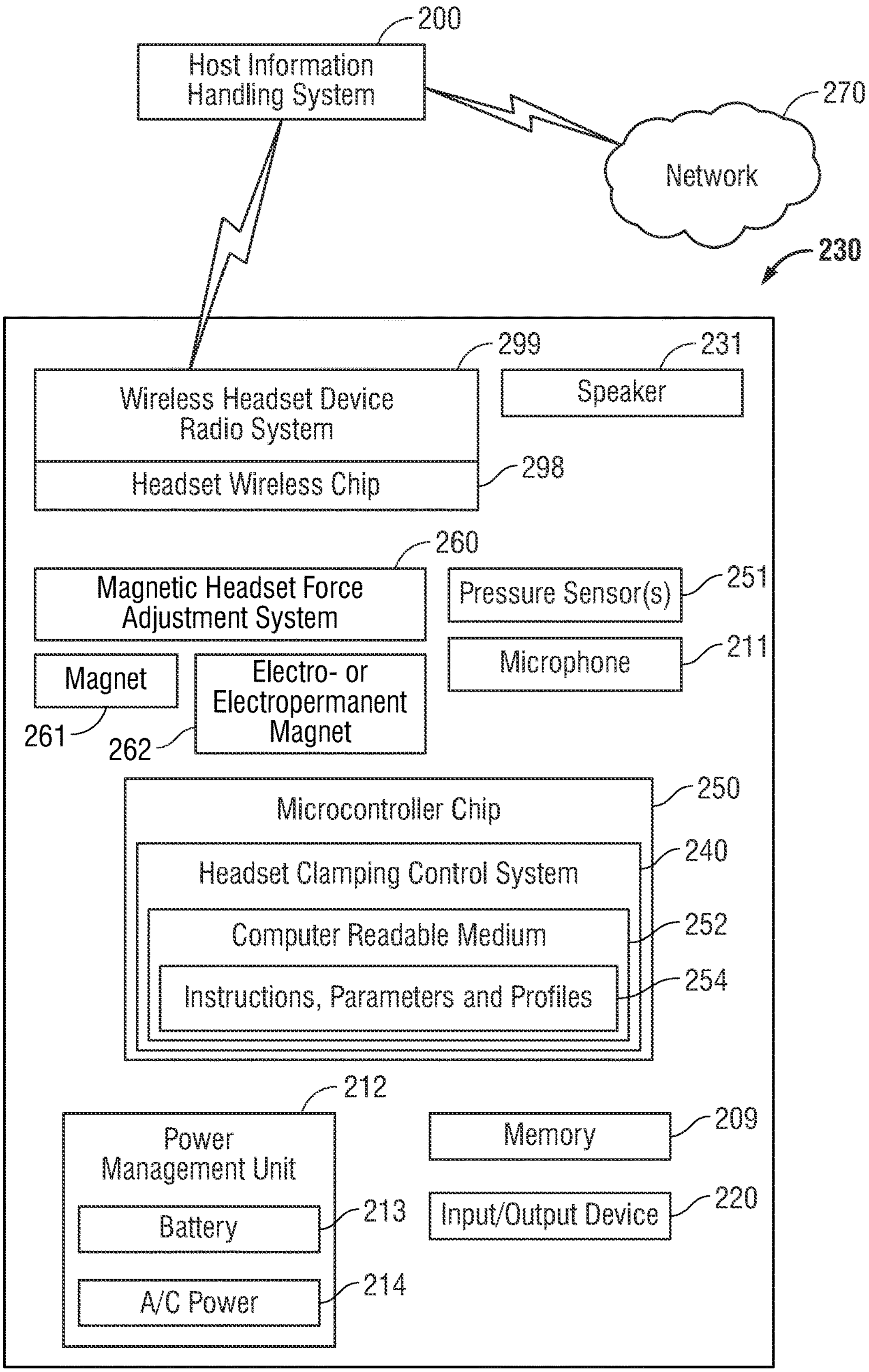
FIG. 2 is a block diagram illustrating a wireless headset device wirelessly coupled to a host information handling system and executing an adaptive clamping force system according to an embodiment of the present disclosure.

FIG. 2 is a block diagram illustrating a wireless headset device 230 operably coupled to a host information handling systems 200 according to an embodiment of the present disclosure. The host information handling system 200 in an embodiment is operably coupled to a wireless headset device 230 capable of wirelessly receiving and transmitting an active audio data stream, such as a voice call or streaming audio content (e.g., podcast, music, etc.) via a link with the wireless headset device radio system 299. The host information handling systems 200 may also be wirelessly coupled to network 270 for receiving or transmitting active audio data streams, such as a video conference call, a voice call, or streaming audio content via network 270 in some embodiments.

In an embodiment of the present disclosure, the wireless headset device 230 may comprise a wearable hearing device that a user may position over or around the user's ears, such as headphones. Such a wireless headset device 230 in an embodiment may house a microphone 211 for recording a user's voice and a speaker 231 for outputting or playing audio data received from the host information handling system 200.

A power management unit 212 with a battery 213 or A/C power charging adapter 214 may be on the wireless headset device 230 to provide power to the microcontroller chip 250, the speaker 231, the pressure sensor 251, the microphone 211, a magnetic headset force adjustment system 260, a current-adjustable magnet such as an electro-magnet or electro-permanent magnet 262, a headset wireless chip 298, the wireless headset device radio system 299, or other components of the wireless headset device 230. An input/output device 220, such as a push button, a voice assistant, digital display, capacitive or resistive touch switch, or physical switch, for example, may allow the user to activate the wireless headset device 230 or to control mute or volume provided to the speaker 231 and microphone 211 of the wireless headset device 230.

In an embodiment, the wireless headset device 230 may include a microcontroller integrated circuit chip 250 that may be any processing resource device or devices that execute instructions, parameters, and profiles 254 and may have associated computer readable medium 252 for storage of code instructions of a headset clamping control system 240. The headset clamping control system 240 may be executed to facilitate generating and causing commands or instructions to the magnetic headset force adjustment system 260 to automatically adjust clamping force on a user's head depending on force sensed by the pressure sensor 251 in various embodiments. More specifically, instructions 254 may be executed by the microcontroller chip 250, for example a controller integrated circuit, to generate controls to increase clamping pressure or decrease clamping pressure via the magnetic headset force adjustment system 260 according to embodiments herein. In particular, the magnetic headset force adjustment system 260 receives adjustment commands from the execution of the headset clamping control system 240 to cause one or more electro-magnets or electro-permanent magnets 262 to adjust or switch its polarity relative to a permanent magnet or magnets 261 to variously attract or repel at plural levels of magnetic force and adjust a position of a cushion cradle relative to the earcup of the wireless headset device 230 in embodiments herein. In some embodiments, this may occur automatically to detection of clamping force on a user's head with one or more pressure sensors 251 located in an earcup cushion to determine if the clamping force is within a threshold clamping force range determined to be comfortable for users. For example, the threshold clamping force range may be between 1 newton (N) of force on the lower end of the threshold clamping force range and 14 N of force on the upper end of the threshold clamping force range in one example embodiment. Any values of clamping force may be used for the threshold clamping force range as determined by testing of the wireless (or wired) headset device and comfort levels of wearability on users.

The wireless headset device radio system 299 may provide connectivity of the wireless headset device 230 to the host information handling system 200, 201 via one or more wireless links. For example, the wireless headset device radio system 299 may establish a wireless link directly to the host information handling system 200 and such wireless links may be established pursuant to the Bluetooth® or Bluetooth Low Energy (BLE) protocols, for example. In some embodiments, the Bluetooth® protocols or BLE protocols (e.g., protocols established under the Institute of Electrical and Electronics Engineers protocol 802.15.1) may be used to establish a Private Area Network (PAN) in which the wireless headset device 230 may communicate wirelessly with the host information handling system 200. In other embodiments, a wired headset device may be used with the embodiments described herein including a wired headset device having a magnetic headset force adjustment system and force sensors in earcup cushions and a headset clamping control system 240 executed by a microcontroller integrated circuit chip 250.

Memory 209 may contain computer-readable medium (not shown), such as RAM in an example embodiment. An example of memory 209 includes random access memory (RAM) such as static RAM (SRAM), dynamic RAM (DRAM), non-volatile RAM (NV-RAM), or the like, read only memory (ROM), another type of memory, or a combination thereof. Memory 209 may also comprise static memory containing computer-readable medium (not shown), such as NOR or NAND flash memory in some example embodiments. The instructions, parameters, and profiles 254 of the audio and headset clamping control system 240 may be stored in memory 209 on a computer-readable medium 252 such as a flash memory in an example embodiment.

Figure 3:
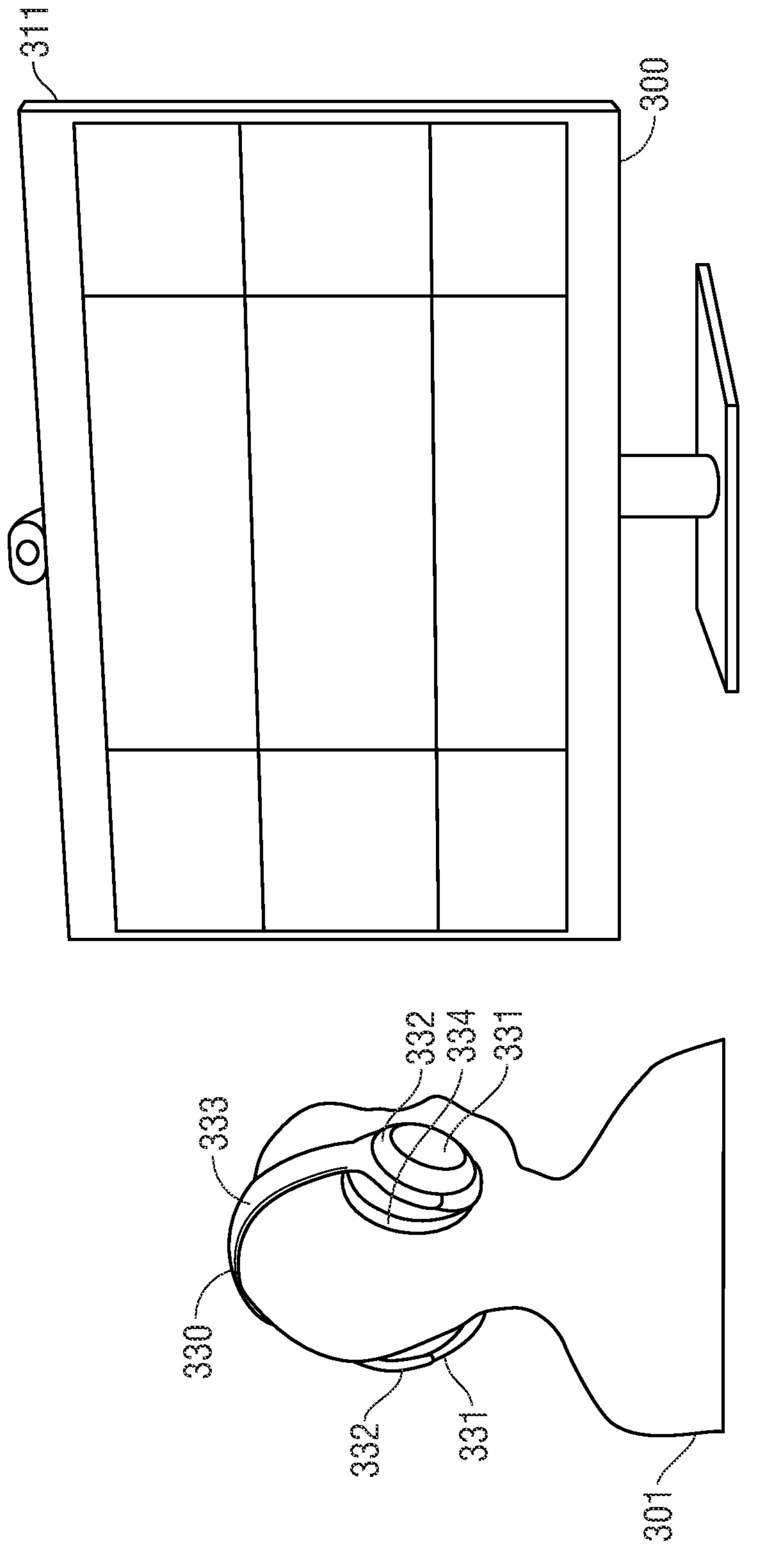
FIG. 3 is a graphical diagram illustrating a wireless headset device worn by a user with a host information handling system according to an embodiment of the present disclosure.

FIG. 3 is a graphical diagram illustrating a wireless headset device coupled to a host information handling system with a user wearing the wireless headset device according to an embodiment of the present disclosure. FIG. 3 shows a user 301 wearing a wireless headset device 330 while interacting with a host information handling system 300. The wireless headset device 330 may be a headphone set as shown and include one or more speakers 331 located in earcups 332 of the headphones 330. The speakers 331 may be used to play an active audio data stream received wirelessly received from software applications or streaming audio sources via the host information handling system 300. The earcups 332 may be connected with a headband 333 that fits over a user's head and is formed to apply a clamping force to the user's head to fit the wireless headset device 330 onto the user's head and over the user's ears. The earcup housings 332 of the headset 330 contain the speakers 331, any microphone, microcontroller integrated circuit chip in various embodiments, Further, the earcup housings 332 are connected via the headband 333 and wherein they have earcup cushions 334 that rest against the user's head and encompass the user's ears in various embodiments. The earcup cushions 334 are operatively coupled to a cushion cradle (not shown) that may have one or more permanent magnets affixed thereto for interaction with one or more reciprocal electro-magnets or electro permanent magnets as part of a magnetic headset force adjustment system in an embodiment. The magnetic headset force adjustment system is housed within the earcup housings 332 and operates to magnetically urge the earcup cushions 334 away from the earcup housings 332 toward a user's head to increase clamping force or urge the earcup cushions 334 into the earcup housings to decrease clamping force of the wireless headset device on the user's head. The earcup cushions 334 may contain one or more pressure sensors (not shown) in some embodiments. Further, the earcup cushions 334 and their cushion cradle structure are operatively coupled to the earcup housings 332 via a compressible layer or gasket that may be stretched or compressed depending on whether the cushion cradle structure and earcup cushion 334 are urged toward the user's head to increase clamping force or are urged away from the user's head and into the earcup housings 332 to decrease clamping force respectively. Additional detail of the headset device 330, whether wireless as shown or wired, is shown in FIGS. 4A and 4B below.

The host information handling system 300 may be a laptop, a tablet, a desktop computing system, an all-in-one or other type of information handling system as described in embodiments herein. The host information handling system 300 may include a display device 311 in which one or more software applications, hardware, or data files may be presented as content to a user with content items such as GUIs, windows, icons, or others. As described in embodiments herein, the user may interact with content, such as GUIs, windows, icons or the like, on the display device 311 at the host information handling system 300 with audio played at a speaker or received at a microphone of the wireless headset device 330 according to embodiments herein.

Figure 4B:
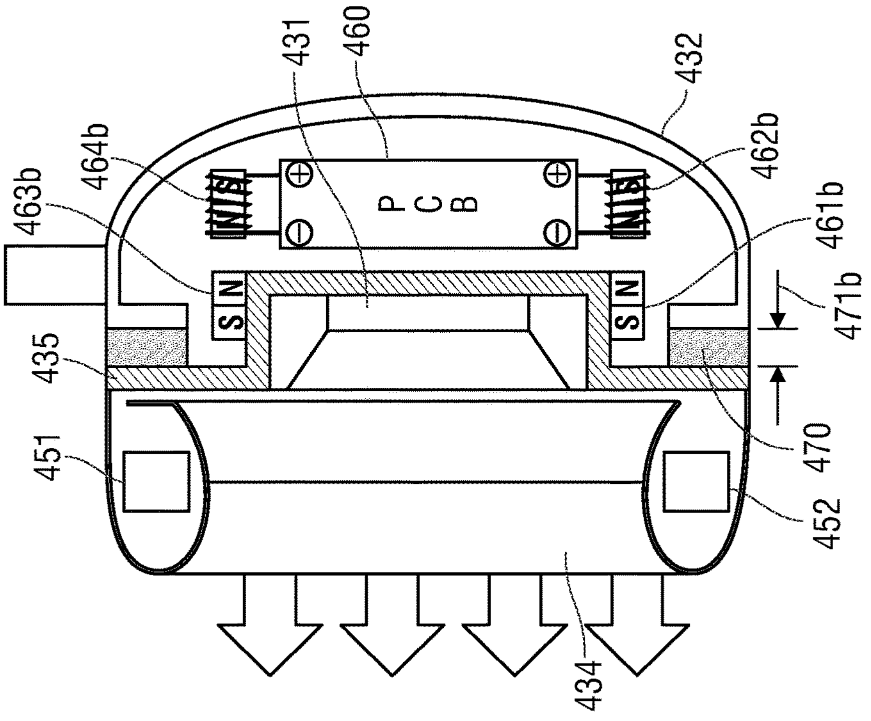
FIG. 4B is a graphical diagram illustrating a wireless headset device with a magnetic headset force adjustment system in a second, increased clamping force state according to another embodiment of the present disclosure.
Figure 4A:
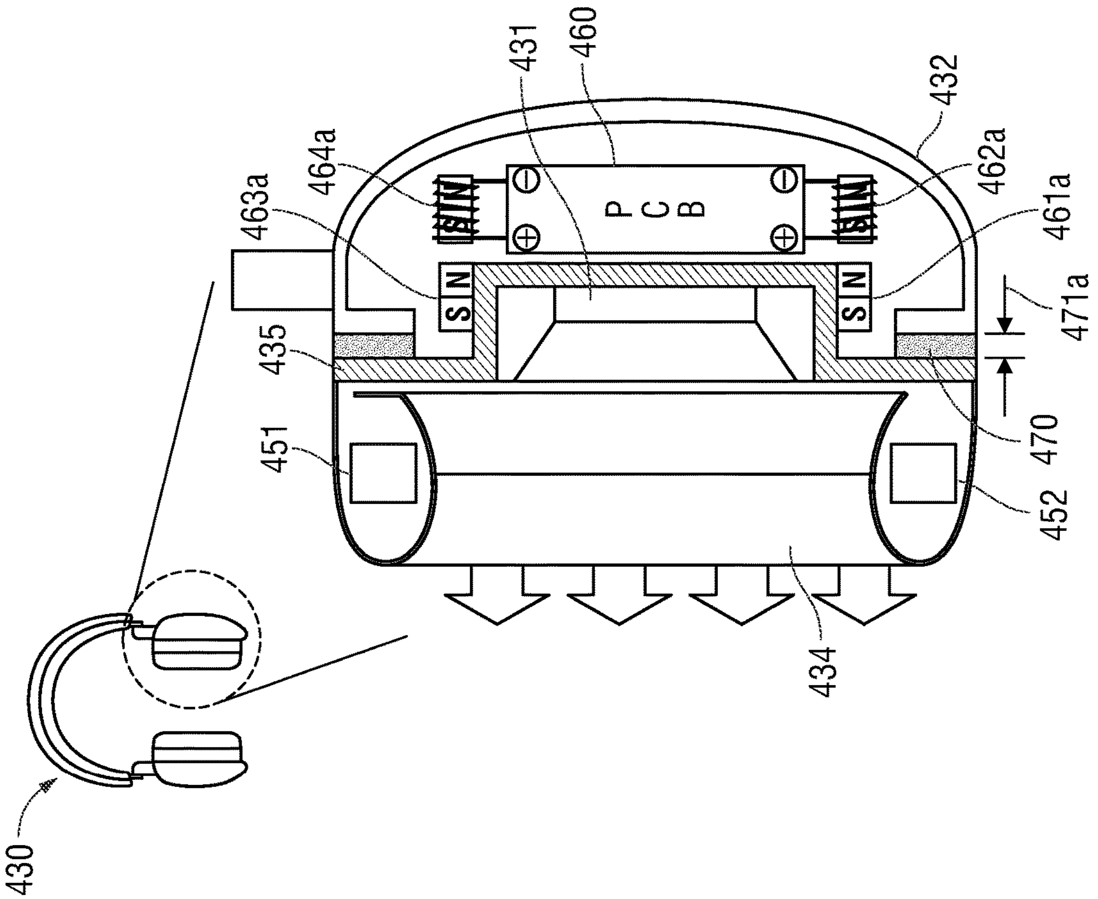
FIG. 4A is a graphical diagram illustrating a wireless headset device with a magnetic headset force adjustment system in a first, reduced clamping force state according to an embodiment of the present disclosure.

FIG. 4A and FIG. 4B are graphical diagrams illustrating a wireless headset device and a cross-section closeup of one earcup housing and earcup cushion with a magnetic headset force adjustment system according to an embodiment of the present disclosure. FIG. 4A shows the earcup housing 432 and earcup cushion 434 in a first state that involves a clamping force decreasing state with operation of the magnetic headset force adjustment system urging the cushion cradle structure 435 and earcup cushion 434 away from a user's head and into the earcup housing 432 in an embodiment. According to an embodiment herein, the earcup cushion 434 includes one or more pressure sensors 451, 452 located in the earcup cushion 434 in an embodiment. The earcup cushion 434 is operatively coupled to and may be mounted on a cushion cradle 435 that is movable axially with respect to the earcup housing 432 in an embodiment. The cushion cradle 435 encapsulates, in part at least, a speaker 431 which may move axially with the cushion cradle 435 in some embodiments. In other embodiments, speaker 431 may be fixed within the earcup housing 432 and the cushion cradle 435 and earcup cushion 434 may move separately.

Cushion cradle 435 may be operatively coupled to the earcup housing 432 via a compressible layer or gasket 470. The compressible layer or gasket 470 may be a silicone rubber layer or gasket that may compress or stretch with operation of the magnetic headset force adjustment system shown to urge the cushion cradle 435 toward a user's head or away from the user's head and into the earcup housing 432 to adjust clamping force according to embodiments herein. The compressible layer or gasket 470 is shown in a compressed state, as shown by the distance bar 471*a*, due to the magnetic headset force adjustment system being in a first state to exert a lower or lesser clamping force The cushion cradle 435 has a permanent magnet or magnets 461*a* and 463*a* operatively coupled to the cushion cradle 435 structure and which may be urged to move axially by electro-magnets or electro-permanent magnets 462*a* and 464*a* in an embodiment depending on the polarity and magnetic force level of one or more electro-magnets or electro-permanent magnets 462*a* and 464*a* used in various embodiments. In the shown embodiment, the polarity of one or more electro-magnets or electro-permanent magnets 462*a* and 464*a* are of opposite polarity to the one or more fixed magnets 461*a* and 463*a* such that an attractive magnetic force urges the one or more electro-magnets or electro-permanent magnets 462*a* and 464*a* the one or more fixed magnets 461*a* and 463*a* together pulling outward the cushion cradle 435 into the earcup housing 432. The electro-magnets or electro-permanent magnets 462*a* and 464*a* are operatively coupled to a printed circuit board fixed in the earcup housing 432 and having a microcontroller integrated circuit 460 that may execute instructions of a headset clamping control system according to embodiments herein. The compressible layer or gasket 470 then compresses to a narrower width 471*a* and the earcup cushion 434 exerts less clamping force on the user's head in an embodiment. The clamping control system may switch the polarity of one or more one or more current-controlled magnets such as electro-magnets or electro-permanent magnets 462*a* and 464*a* at varying combinations to achieve levels of attractive magnetic force and adjustment of clamping force with one or more fixed magnets 461*a* and 463*a* of opposite or the same polarity in various mixed combinations according to another embodiment. In this way, multiple headset clamping force reduction levels may be achieved with the magnetic headset force adjustment system shown in FIG. 4A in varying embodiments. Adjustable levels of magnetic force are achieved by having a plurality of current-controlled magnets paired with a plurality of fixed magnets on the axially movable cushion cradle. The clamping force control system may instruct the magnetic headset force adjustment system to provide current or current pulses to each current-controlled magnet 462*a* and 464*a* in a stepped sequence where each step may increase the attractive force to the paired, fixed magnets 461*a* and 463*a*. In this way, the plurality of current-controlled magnets to generate a stepped sequence of increased attracting magnetic forces to urge the cushion cradle away from the user's head and into the earcup housing 432 and provide for stepped levels of decreasing the clamping force of the headset device on the user's head.

It is understood that one or more electro-magnets 462*a* and 464*a* may have their polarity switched to attract a fixed magnet 461*a* or 462*a* depending on the direction of current supplied through a winding on the electro-magnet and further an amount of current may determine a level of magnetic strength in one embodiment. However, electro-magnets used for 462*a* and 464*a* require constant current for a magnetic field and may consume additional power, particularly in a battery powered wireless headset device 430. In another embodiment, one or more electro-permanent magnets may be used at 462*a* and 464*a* and their polarities flipped with a temporary current surge or pulse through the coiled windings around the electro-permanent magnet 462*a* and 464*a*. In this embodiment, the polarity of any combination of one or more of these electro-permanent magnet 462*a* and 464*a* may be switched with a current pulse depending on a direction of the current pulse around the windings. With plural electro-permanent magnets 462*a* and 464*a* used, plural levels of attraction or repelling magnetic force may be used when paired with the fixed one or more fixed magnets 461*a* and 463*a* according to embodiments herein.

FIG. 4B shows the earcup housing 432 and earcup cushion 434 in a second state that is a force increasing state with operation of the magnetic headset force adjustment system urging the cushion cradle structure 435 and earcup cushion 434 toward the user's head and away from the earcup housing 432 in an embodiment. According to embodiments as described herein, the earcup cushion 434 includes one or more pressure sensors 451, 452 located in the earcup cushion 434 in an embodiment. The earcup cushion 434 is operatively coupled to and may be mounted on a cushion cradle 435 that is movable axially with respect to the earcup housing 432 in an embodiment. The cushion cradle 435 encapsulates, in part at least, a speaker 431 which may or may not move axially with the cushion cradle 435 in various embodiments. The cushion cradle 435 is operatively coupled to the earcup housing 432 via a compressible layer or gasket 470. The compressible layer or gasket 470 may be a silicone rubber layer or gasket that may compress or stretch with operation of the magnetic headset force adjustment system shown to urge the cushion cradle 435 toward a user's head as shown according to the present embodiment. The compressible layer or gasket 470 is shown in a stretched state, as shown by the distance bar 471*b*, due to the magnetic headset force adjustment system being in a first state to exert a higher or greater clamping force, relative to the first state shown in FIG. 4A.

As previously described, the cushion cradle 435 has a permanent magnet or magnets 461*b* and 463*b* operatively coupled to the cushion cradle 435 structure and which may be urged to move axially by electro-magnets or electro-permanent magnets 462*b* and 464*b* in an embodiment depending on the polarity and magnetic force level of one or more electro-magnets or electro-permanent magnets 462*b* and 464*b* according to embodiments. In the shown embodiment, the polarity of one or more electro-magnets or electro-permanent magnets 462*b* and 464*b* are of a similar polarity to the one or more fixed magnets 461*b* and 463*b* such that a repelling magnetic force urges the one or more electro-magnets or electro-permanent magnets 462*b* and 464*b* and the one or more fixed magnets 461*b* and 463*b* apart and pushing the cushion cradle 435 inward toward the user's head. The electro-magnets or electro-permanent magnets 462*b* and 464*b* are operatively coupled to a printed circuit board fixed in the earcup housing 432 and having a microcontroller integrated circuit 460 that may execute instructions of a headset clamping control system according to embodiments herein. The compressible layer or gasket 470 then stretches to a wider width 471*b* and the earcup cushion 434 exerts greater clamping force on the user's head in an embodiment. The clamping control system may switch the polarity of one or more one or more electro-magnets or electro-permanent magnets 462*b* and 464*b* at varying combinations to achieve levels of repelling magnetic force and adjustment of clamping force with one or more fixed magnets 461*b* and 463*b* of the same polarity or some of opposite polarity in various mixed combinations according to another embodiment. In this way, multiple headset clamping force increasing levels may be achieved with the magnetic headset force adjustment system shown in FIG. 4B in varying embodiments. Adjustable levels of magnetic force are achieved by having a plurality of current-controlled magnets paired with a plurality of fixed magnets on the axially movable cushion cradle. The clamping force control system may instruct the magnetic headset force adjustment system to provide current or current pulses to each current-controlled magnet 462*b* and 464*b* in a stepped sequence where each step may increase the repelling magnetic force to the paired, fixed magnets 461*b* and 463*b*. In this way, the plurality of current-controlled magnets to generate a stepped sequence of increased repelling magnetic forces to urge the cushion cradle toward the user's head and away from the earcup housing 432 and provide for stepped levels of increasing the clamping force of the headset device on the user's head.

As described above, it is understood that one or more electro-magnets 462*b* and 464*b* may have their polarity switched to attract a fixed magnet 461*b* or 462*b* depending on the direction of current supplied through a winding on the electro-magnet and further an amount of current may determine a level of magnetic strength in one embodiment. However, electro-magnets used for 462*b* and 464*b* require constant current for a magnetic field and may consume additional power, particularly in a battery powered wireless headset device 430. In another embodiment, one or more electro-permanent magnets may be used at 462*b* and 464*b* and their polarities flipped with a temporary current surge through the coiled windings around the electro-permanent magnet 462*b* and 464*b*. In this embodiment, the polarity of any combination of one or more of these electro-permanent magnet 462*b* and 464*b* may be switched with a current pulse depending on a direction of the current pulse around the windings. With plural electro-permanent magnets 462*b* and 464*b* used, plural levels of attraction or repelling magnetic force may be used when paired with the fixed one or more fixed magnets 461*b* and 463*b* according to embodiments herein.

Figure 5:
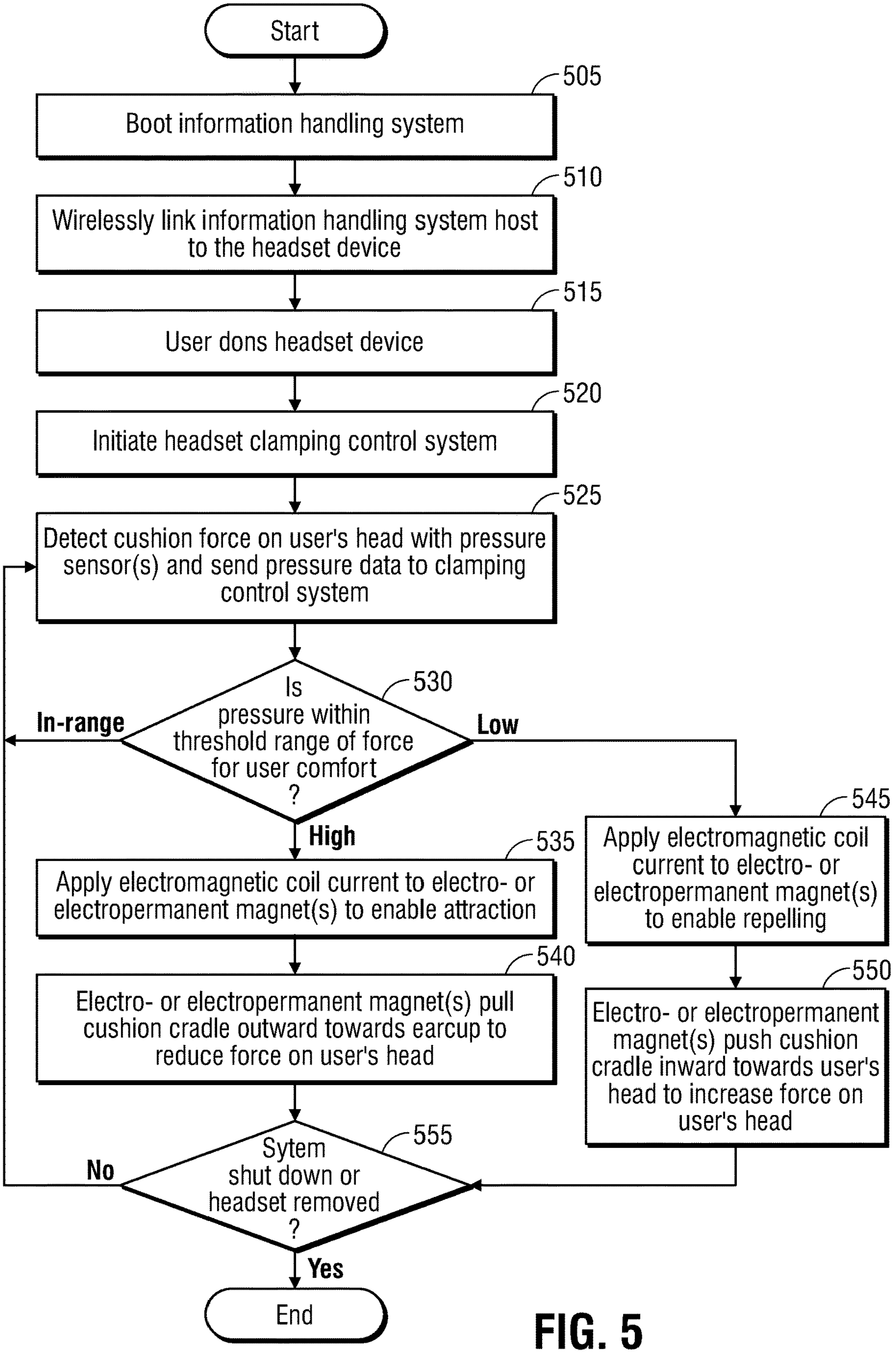
FIG. 5 is a flow diagram illustrating a method of operating a headset clamping control system with magnetic headset force adjustment according to an embodiment of the present disclosure.

FIG. 5 is a flow diagram illustrating a method of operating a headset clamping control system with a magnetic headset force adjustment system for a clamping force adjustment to a user's head depending on force detected according to an embodiment of the present disclosure. According to embodiments herein, the headset clamping control system may detect a clamping force on a user's head when the headset device, wired or wireless, is worn by the user via one or more pressure sensors in earcup cushions of the headset device. The headset clamping control system sends signals to a magnetic headset force adjustment system according to embodiments herein to supply current to a current-adjustable magnet such as an electro-magnet or an electro-permanent magnet in various embodiments. The supplied current may alter polarity of one or more current-adjustable magnets in some embodiments, such as the electro-magnets or electro-permanent magnets in various combinations, which may alter the clamping force of the headset device on the user. In some embodiments, plural decreasing levels of clamping force and plural increasing levels of clamping force relative to a middle, static level may be used with plural magnets and electro-magnets or electro-permanent magnets to adjust the headset clamping force on a user's head automatically to be within a threshold clamping force range for comfort for the user in embodiments herein.

At block 505, the host information handing system may boot up in an embodiment. A user may turn on the information handling system to cause BIOS and OS systems to boot. Further, the user may initiate one or more software applications that may include interfacing with hardware and data files. Such software applications may present audio content or receive audio content at a host information handling system.

At block 510, the wireless network interface device of the host information handling system may establish a wireless link between a wireless headset device and the host information handling system in an embodiment of the present disclosure where a wireless headset device is involved. In an alternative embodiment, a wired headset device may employ the systems and method of the embodiments herein and a wired link may be established between the wired headset device and the host information handling system. For purposes of discussion however, embodiments of the present disclosure will be with regard to a wireless headset device although it is contemplated that operation of the headset clamping control system and the magnetic headset force adjustment system may be applied as well to a wired headset device.

First, a user may turn on a wireless headset device and power it up. Upon doing so, the wireless headset device may be available for or may seek to wirelessly couple to the host information handling system in some embodiments. In other embodiments, the wireless headset radio system may initiate a wireless coupling with the network interface device at the host information handling system detected within wireless range or the host network interface device may initiate wireless coupling. In some embodiments, upon powering up the host information handling system and the wireless headset device, they may pair via a pre-pairing procedure such as via Bluetooth® or BLE. Other wireless protocols, such as Wi-Fi, NFC, 5G small cell system, or others, may be used to establish a wireless link as well according to various embodiments and are recited herein with respect to FIG. 1.

Proceeding to block 515, the user may don or put on the wireless headset device. In an embodiment, a user may fit the wireless headset device earcups and earcup cushions over the user's ears while the headband spans around the top or back of the user's head between the earcups. At block 520, the microcontroller may initiate the headset clamping control system software or firmware on the wireless headset device in an embodiment. This may include initiating any drivers and current control for application of current to the current controlled magnet of the magnetic headset force adjustment system in some embodiments. In an embodiment, current may be supplied in either of two directions around a coil of an electro-magnet. In another embodiment, one or more current pulses may be supplied in either to two directions around a coil winding of electro-permanent magnet to change polarity of the electro-permanent magnet as understood in the art. Initiating the headset clamping control system may also include initiation of any drivers to drive the current for the current-adjustable magnets and for activation of the pressure sensor or sensors in the earcup cushions of the wireless headset device as well as other parts of the magnetic headset force adjustment system.

At block 525, the pressure sensors in the earcup cushions may detect a clamping force through the earcup cushions on the user's head. The pressure sensors may detect pressure via a deflection of a membrane or a piezo element in some example embodiments to determine the pressure through the earcup cushions being applied to the pressure sensor. This pressure level detected by one or more pressure sensors is sent to the clamping force control system and a clamping force being applied by the wireless headset device on the user's head may then be determined. Multiple pressure sensors may be used to determine an average clamping force on the user's head since a single pressure sensor may provide an outlier value depending on how the wireless headset device is being worn. In some embodiments, an outlier value may be discarded. After the headset clamping control system receives the pressure readings from the plurality of pressure sensors in the earcup cushions and determines a level of clamping force on the user's head, the clamping force is compared to a clamping force threshold range that corresponds to an acceptable range of clamping force values for a user's wearability comfort of the wireless headset device. In an embodiment, this clamping force threshold range may have a high value at which a clamping force above this value requires a clamping force reduction measure be applied. In another embodiment, this clamping force threshold range may have a low value at which a clamping force below this value requires a clamping force increase measure be applied.

At block 530, the clamping force control system executing on the microcontroller integrated circuit chip may determine whether the measured clamping force from the pressure sensor or sensors is within a clamping force threshold range of values for user comfort in an embodiment. In a particular embodiment, the average values from a plurality of pressure sensors may be used to determine a clamping force level of the wireless headset on a user's head. In another embodiment, one or more outlier values may be thrown out, and the remainder of pressure sensor values may be used to determine the clamping force. In yet another embodiment, a factor may be determined based on factors of the design of the wireless headset for the earcup cushion compression, compressible material or gasket compression, and other variables of the design of the wireless headset device to translate pressure sensor readings to clamping force in some embodiments. In other embodiments, raw pressure sensor readings or an average of the same may be used without conversion for comparison to a clamping force threshold range or acceptable pressure sensor range that is stored in a memory of the headset device. In at least one example embodiment, the threshold clamping force range may be between 1 N of force on the lower end of the threshold clamping force range and 14 N of force on the upper end of the threshold clamping force range. Other embodiments contemplate that additional clamping threshold force range values may be used to determine if the measured or average clamping force or pressure readings detected by pressure sensors falls within an acceptable comfort range, is too high, or is too low.

If the measured or average clamping force is in-range with the clamping force threshold range for user comfort, then flow returns to block 525 where the clamping force control system continues to monitor, periodically or continuously, the pressure sensors for additional clamping force measurement to determine if the clamping force threshold range continues to be met with the user wearing the wireless headset device. Flow then again proceeds to block 530 to determine if the clamping force threshold range is met by the measured clamping force from the pressure sensors.

If the measured or average clamping force is above the high threshold of the clamping force threshold range for user comfort, then flow continues to block 535 where the clamping force control system may make an adjustment to cause less clamping force from the wireless headset via the magnetic headset force adjustment system in another embodiment. If the measured or average clamping force is below the low threshold of the clamping force threshold range for user comfort, then flow continues to block 545 where the clamping force control system may make an adjustment to cause more clamping force from the wireless headset via the magnetic headset force adjustment system in an embodiment.

At block 535, when the clamping force control system determines that the measured or average clamping force is above a high threshold value of the clamping force threshold range, then the clamping force control system may issue a command or instruction to decrease the clamping force to the magnetic headset force adjustment system in an embodiment. The clamping force control system instruction to transition to a first state that may include at least one level of a force decreasing actuation of the magnetic headset force adjustment system. Such an operation of the magnetic headset force adjustment system as described with reference to FIG. 4A, may supply electromagnetic current to a coil surrounding one or more electro-magnets or electro-permanent magnets 462*a* and 464*a*. The direction of the electrical current supplied around the coils may determine the polarity of one or more electro-magnets or electro-permanent magnets 462*a* and 464*a* to generate an attractive magnetic force with adjacent permanent magnet or magnets 461*a* and 463*a*. In a particular embodiment, multiple electro-magnets or electro-permanent magnets 462*a* and 464*a* change polarities in a particular combination or number of electro-magnets or electro-permanent magnets 462*a* and 464*a* to allow for stepped adjustment in increasing clamping force via the magnetic headset force adjustment system. In a particular embodiment, the direction of the current applied to the electro-magnets or electro-permanent magnets 462*a* and 464*a* may establish a polarity of the electro-magnets or electro-permanent magnets 462*a* and 464*a* to be of a opposite polarity to the one or more adjacent fixed magnets 461*a* and 463*a* such that an attracting magnetic force is generated and urges the one or more fixed magnets 461*a* and 463*a* towards the one or more electro-magnets or electro-permanent magnets 462*a* and 464*a*. Operation of current variable magnets 462*a* and 464*a* as electro-magnets may operate according to embodiments herein. Operation of current variable magnets 462*a* and 464*a* as electro-permanent magnets may also operate according to embodiments described herein. Either may be used in various embodiments.

Proceeding to block 540, the magnetic headset force adjusting system operating as described above FIG. 4A generates an attracting magnetic force between the electro-magnets or electro-permanent magnets 462*a* and 464*a* and the one or more fixed magnets 461*a* and 463*a*. The one or more fixed magnets 461*a* and 463*a* may be operatively coupled to the cushion cradle 435 of the wireless headset device which is axially movable relative to the earcup housing 432. The attracting magnetic force between the electro-magnets or electro-permanent magnets 462*a* and 464*a* and the one or more adjacent, fixed magnets 461*a* and 463*a* based on opposite polarities pulls the cushion cradle 435 toward the earcup housing 432 and outward away from the user's head. The electro-magnets or electro-permanent magnets 462*a* and 464*a* are operatively coupled to a printed circuit board fixed in the earcup housing 432. The compressible layer or gasket 470 then compresses to a narrower width 471*a* and the earcup cushion 434 exerts less clamping force on the user's head in an embodiment. As described, the clamping control system may switch the polarity of one or more electro-magnets or electro-permanent magnets 462*a* and 464*a* at varying combinations to achieve levels of attracting magnetic force and adjustment of clamping force with one or more fixed magnets 461*a* and 463*a* having an opposite adjacent polarity and some even having as same polarity and repelling in various mixed combinations to achieve these varying clamping force level decreases according to embodiments of the present disclosure. Flow may then proceed to block 555 to determine of the wireless headset device is turned off or removed from a user's head.

Returning to block 530, if the measured or average clamping force is below a low threshold value of the clamping force threshold range, then flow will proceed to block 545. At block 545, when the clamping force control system determines that the measured or average clamping force is below a low threshold value of the clamping force threshold range, then the clamping force control system may issue a command or instruction to increase the clamping force to the magnetic headset force adjustment system in an embodiment. The clamping force control system instruction to transition to a second state that may include at least one level of a force increasing actuation of the magnetic headset force adjustment system. The operation of the magnetic headset force adjustment system as described with FIG. 4B, may supply electromagnetic current to a coil surrounding one or more electro-magnets or electro-permanent magnets 462*b* and 464*b*. The direction of the electrical current supplied around the coils may determine the polarity of one or more electro-magnets or electro-permanent magnets 462*b* and 464*b* to generate a repelling magnetic force with a permanent magnet or magnets 461*b* and 463*b*. In a particular embodiment, multiple electro-magnets or electro-permanent magnets 462*b* and 464*b* may be used with changing polarities of a particular combination or number of electro-magnets or electro-permanent magnets 462*b* and 464*b* to allow for stepped adjustment in increasing clamping force via the magnetic headset force adjustment system. In a particular embodiment, the direction of the current applied to the electro-magnets or electro-permanent magnets 462*b* and 464*b* may establish a polarity of the electro-magnets or electro-permanent magnets 462*b* and 464*b* to be of a similar polarity to the one or more adjacent fixed magnets 461*b* and 463*b* such that a repelling magnetic force is generated and urges the one or more electro-magnets or electro-permanent magnets 462*b* and 464*b* from the one or more fixed magnets 461*b* and 463*b* apart. Operation of current variable magnets 462*b* and 464*b* as electro-magnets may operate according to embodiments herein. Operation of current variable magnets 462*b* and 464*b* as electro-permanent magnets may also operate according to embodiments described herein. Either may be used in various embodiments.

Proceeding to block 550, the magnetic headset force adjusting system operating as described above to generate a repelling force between the electro-magnets or electro-permanent magnets 462*b* and 464*b* and the one or more fixed magnets 461*b* and 463*b*. The one or more fixed magnets 461*b* and 463*b* may be operatively coupled to the cushion cradle 435 of the wireless headset device. The repelling force between the electro-magnets or electro-permanent magnets 462*b* and 464*b* and the one or more fixed magnets 461*b* and 463*b* pushes the cushion cradle 435 away from the earcup housing 432 and inward toward the user's head. The electro-magnets or electro-permanent magnets 462*b* and 464*b* are operatively coupled to a printed circuit board fixed in the earcup housing 432. The compressible layer or gasket 470 then stretches to a wider width 471*b* and the earcup cushion 434 exerts greater clamping force on the user's head in an embodiment. As described, the clamping control system may switch the polarity of one or more one or more electro-magnets or electro-permanent magnets 462*b* and 464*b* at varying combinations to achieve levels of repelling magnetic force and adjustment of clamping force with one or more fixed magnets 461*b* and 463*b* having a same adjacent polarity and some even having an opposite polarity in various mixed combinations to achieve these varying clamping force level increases according to embodiments of the present disclosure. Flow may then proceed to block 555.

At block 555, the clamping force control system determines if the wireless headset device is shut down or the wireless headset is removed from the user's head, such as via the pressure sensors going to zero. If not shut down or removed, then flow may return to block 525 to detect clamping force via the pressure sensors at the newly adjusted level and the clamping force control system may monitor for whether the measured or average clamping force falls within the clamping force threshold range for user comfort at block 530. Then the method may proceed again as described. If the wireless headset device is being shut down or being removed at block 555, then the method may end.

The blocks of the flow diagram of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A headset device executing code instructions of a clamping force control system comprising:

a headband and at least one earcup housing having a speaker, where the headset fits over a user's ear and on a user's head;

the earcup housing including an earcup cushion operatively coupled to a cushion cradle axially movable in the earcup housing;

a pressure sensor in the earcup cushion to measure clamping force of the headset device on the user's head;

a microcontroller executing code instructions of the clamping force control system to determine that the measured clamping force of the headset device is below a low threshold clamping force of a clamping force threshold range for comfort of a user;

a magnetic headset force adjustment system having a fixed magnet operatively coupled to the axially movable cushion cradle and a current-controlled magnet operatively coupled to a printed circuit board in the earcup housing; and the clamping force control system instructing the magnetic headset force adjustment system to provide current in a first direction to the current-controlled magnet to establish a polarity of the current-controlled magnet that is a same polarity as the adjacent fixed magnet to generate a repelling magnetic force to urge the cushion cradle toward the user's head and increase the clamping force of the headset device on the user's head.

2. The headset device of claim 1 further comprising:

the clamping force control system to determine that the measured clamping force of the headset device is above a high threshold clamping force of the clamping force threshold range for comfort of the user; and the clamping force control system instructing the magnetic headset force adjustment system to provide current in a second direction to the current-controlled magnet to establish a second polarity of the current-controlled magnet that is an opposite polarity as the adjacent fixed magnet to generate an attracting magnetic force to urge the cushion cradle away from the user's head and decrease the clamping force of the headset device on the user's head.

3. The headset device of claim 1, wherein clamping force control system instructing the magnetic headset force adjustment system to adjust the measured clamping force of the headset device to within the clamping force threshold range for comfort of the user via the current-controlled magnet.

4. The headset device of claim 1 further comprising:

a plurality of current-controlled magnets paired with a plurality of fixed magnets on the axially movable cushion cradle; and the clamping force control system instructing the magnetic headset force adjustment system to provide current to a stepped sequence of the plurality of current-controlled magnets to generate a stepped sequence of increased repelling magnetic forces to urge the cushion cradle toward the user's head and provide for levels of increasing the clamping force of the headset device on the user's head.

5. The headset device of claim 1, wherein the current-controlled magnet is an electro-magnet where current supplied in the first direction generates the first polarity and current supplied in the second direction generates the second polarity.

6. The headset device of claim 1, wherein the current-controlled magnet is an electro-permanent magnet where a current pulse supplied in the first direction generates the first polarity and the current pulse supplied in the second direction generates the second polarity.

7. The headset device of claim 1 further comprising:

the cushion cradle operatively coupled the earcup housing via a compressible layer that stretches when the cushion cradle is urged toward the user's head to increase the clamping force of the headset device on the user's head.

8. The headset device of claim 7, wherein the compressible layer is a silicone layer between the cushion cradle and the earcup housing.

9. The headset device of claim 1 further comprising:

the clamping force control system to determine that the measured clamping force of the headset device is below a low threshold clamping force of the clamping force threshold range for comfort of the user; and the clamping force control system instructing the magnetic headset force adjustment system to provide current in a second direction to a current-controlled magnet to establish a second polarity of the current-controlled magnet that is a same polarity as the adjacent fixed magnet to generate a repelling magnetic force to urge the cushion cradle toward the user's head and increase the clamping force of the headset device on the user's head.

10. A headset device executing code instructions of a clamping force control system comprising:

a headband and at least one earcup housing having a speaker, where the headset fits over a user's ear and on a user's head;

the earcup housing including an earcup cushion operatively coupled to a cushion cradle axially movable in the earcup housing;

a pressure sensor in the earcup cushion to measure clamping force of the headset device on the user's head;

a microcontroller executing code instructions of the clamping force control system to determine that the measured clamping force of the headset device is above a high threshold clamping force of a clamping force threshold range for comfort of a user;

a magnetic headset force adjustment system having a fixed magnet operatively coupled to the axially movable cushion cradle and a current-controlled magnet operatively coupled to a printed circuit board in the earcup housing; and the clamping force control system instructing the magnetic headset force adjustment system to provide current in a first direction to the current-controlled magnet to establish a first polarity of the current-controlled magnet that is an opposite polarity to the adjacent fixed magnet to generate an attracting magnetic force to urge the cushion cradle away from the user's head and decrease the clamping force of the headset device on the user's head.

11. The headset device of claim 10, wherein clamping force control system instructing the magnetic headset force adjustment system to adjust the measured clamping force of the headset device to within the clamping force threshold range for comfort of the user via the current-controlled magnet.

12. The headset device of claim 10 further comprising:

a plurality of current-controlled magnets paired with a plurality of fixed magnets on the axially movable cushion cradle; and the clamping force control system instructing the magnetic headset force adjustment system to provide current to a stepped sequence of the plurality of current-controlled magnets to generate a stepped sequence of increased attracting magnetic forces to urge the cushion cradle away from the user's head and into the earcup housing and provide for levels of decreasing the clamping force of the headset device on the user's head.

13. The headset device of claim 10, wherein the current-controlled magnet is an electro-magnet where current supplied in the first direction generates the first polarity and current supplied in the second direction generates the second polarity.

14. The headset device of claim 10, wherein the current-controlled magnet is an electro-permanent magnet where a current pulse supplied in the first direction generates the first polarity and the current pulse supplied in the second direction generates the second polarity.

15. The headset device of claim 10 further comprising:

the cushion cradle operatively coupled the earcup housing via a silicone layer that compresses when the cushion cradle is urged away from the user's head and into the earcup housing to decrease the clamping force of the headset device on the user's head.

16. A headset device executing code instructions of a clamping force control system comprising:

a headband and a plurality of earcup housings each having a speaker, where the headset fits over a user's ears and on a user's head;

each of the earcup housings including an earcup cushion operatively coupled to a cushion cradle axially movable in the earcup housings;

a plurality of pressure sensors in the earcup cushions to measure clamping force of the headset device on the user's head;

a microcontroller executing code instructions of the clamping force control system to determine that the measured clamping force of the headset device is outside of a clamping force threshold range for comfort of a user;

a magnetic headset force adjustment system having a fixed magnet operatively coupled to the axially movable cushion cradle in at least one earcup housing and an electro-permanent magnet operatively coupled to a printed circuit board in the at least one earcup housing; and the clamping force control system instructing the magnetic headset force adjustment system to provide a first current pulse to the electro-permanent magnet to generate a repelling magnetic force between the electro-permanent magnet and the fixed magnet operatively coupled to the axially movable cushion cradle to urge the cushion cradle toward the user's head and to increase the clamping force of the headset device on the user's head when the measured clamping force is below the clamping force threshold range; and the clamping force control system instructing the magnetic headset force adjustment system to provide as second current pulse to the electro-permanent magnet to generate an attracting magnetic force between the electro-permanent magnet and the fixed magnet operatively coupled to the axially movable cushion cradle to urge the cushion cradle away from the user's head and to decrease the clamping force of the headset device on the user's head when the measured clamping force is above the clamping force threshold range.

17. The headset device of claim 16, wherein clamping force control system instructing the magnetic headset force adjustment system to adjust the measured clamping force of the headset device until the measured clamping force falls within the clamping force threshold range for comfort of the user via the current-controlled magnet.

18. The headset device of claim 16 further comprising:

a plurality of current-controlled magnets paired with a plurality of fixed magnets on the axially movable cushion cradle; and the clamping force control system instructing the magnetic headset force adjustment system to provide the first or second current to a stepped sequence of the plurality of current-controlled magnet to generate a stepped sequence of repelling or attractive magnetic force to urge the cushion cradle to provide for adjustable levels of the clamping force of the headset device on the user's head.

19. The headset device of claim 16 further comprising:

the cushion cradle is operatively coupled to the earcup housing via a compressible layer that stretches when the cushion cradle is urged toward the user's head and compresses when the cushion cradle is urged away from the user's head.

20. The headset device of claim 16 further comprising:

a headset radio to wirelessly couple the headset device to a host information handling system.

* * * * *